United States Patent [19]

Pronk

[11] Patent Number: 4,591,428
[45] Date of Patent: May 27, 1986

[54] CONTINUOUS PROCESS FOR THE CATALYTIC TREATMENT OF HYDROCARBON OILS

[75] Inventor: Gerrit J. Pronk, The Hague, Netherlands

[73] Assignee: Shell Oil Company, Houston, Tex.

[21] Appl. No.: 707,280

[22] Filed: Mar. 1, 1984

[30] Foreign Application Priority Data

Mar. 1, 1984 [GB] United Kingdom ............... 8405381

[51] Int. Cl.⁴ .................. C10G 45/18; C10G 49/22; B01J 8/12
[52] U.S. Cl. .................. 208/165; 422/192; 422/213; 422/219; 208/168; 208/169
[58] Field of Search ............. 208/165, 168, 169, 173, 208/208 R, 210, 213; 34/165, 174, 57 E; 422/143, 216, 218, 219, 311, 213, 192

[56] References Cited

U.S. PATENT DOCUMENTS

| | | | |
|---|---|---|---|
| 2,400,194 | 5/1946 | Day et al. | 208/168 |
| 2,423,411 | 7/1947 | Simpson | 208/173 |
| 2,546,634 | 3/1951 | Evans | 208/169 |
| 2,594,289 | 4/1952 | Caldwell | 208/169 X |
| 2,647,859 | 8/1953 | Barker | 208/168 |
| 2,740,619 | 4/1956 | Lynch | 208/168 X |
| 2,870,087 | 1/1959 | Gilmore | 208/173 X |
| 3,622,265 | 11/1971 | Weber et al. | 422/216 X |
| 4,167,553 | 9/1979 | Persico et al. | 208/168 X |

FOREIGN PATENT DOCUMENTS

| | | | |
|---|---|---|---|
| 677095 | 8/1952 | United Kingdom | 208/165 |
| 1384762 | 2/1972 | United Kingdom | |

Primary Examiner—Andrew H. Metz
Assistant Examiner—Glenn A. Caldarola
Attorney, Agent, or Firm—Kimbley L. Muller

[57] ABSTRACT

The present invention relates to a continuous process for the catalytic treatment of a hydrocarbon oil and an apparatus for carrying out such process, by passing said oil through one or more catalyst beds within a reactor wherein catalyst is withdrawn from the bottom of the reactor and fresh catalyst is supplied to the top thereof, said catalyst being withdrawn through a discharge funnel contained in the bottom of said reactor, which funnel allows for separation of product from the catalyst via a first main screen located in the funnel upstream of the exit end of said funnel, the withdrawal of product being effected via a product outlet, in which process use is made of a second screen forming part of the discharge funnel system, located between the main screen of the funnel and the product outlet and having a larger mesh size.

10 Claims, 1 Drawing Figure

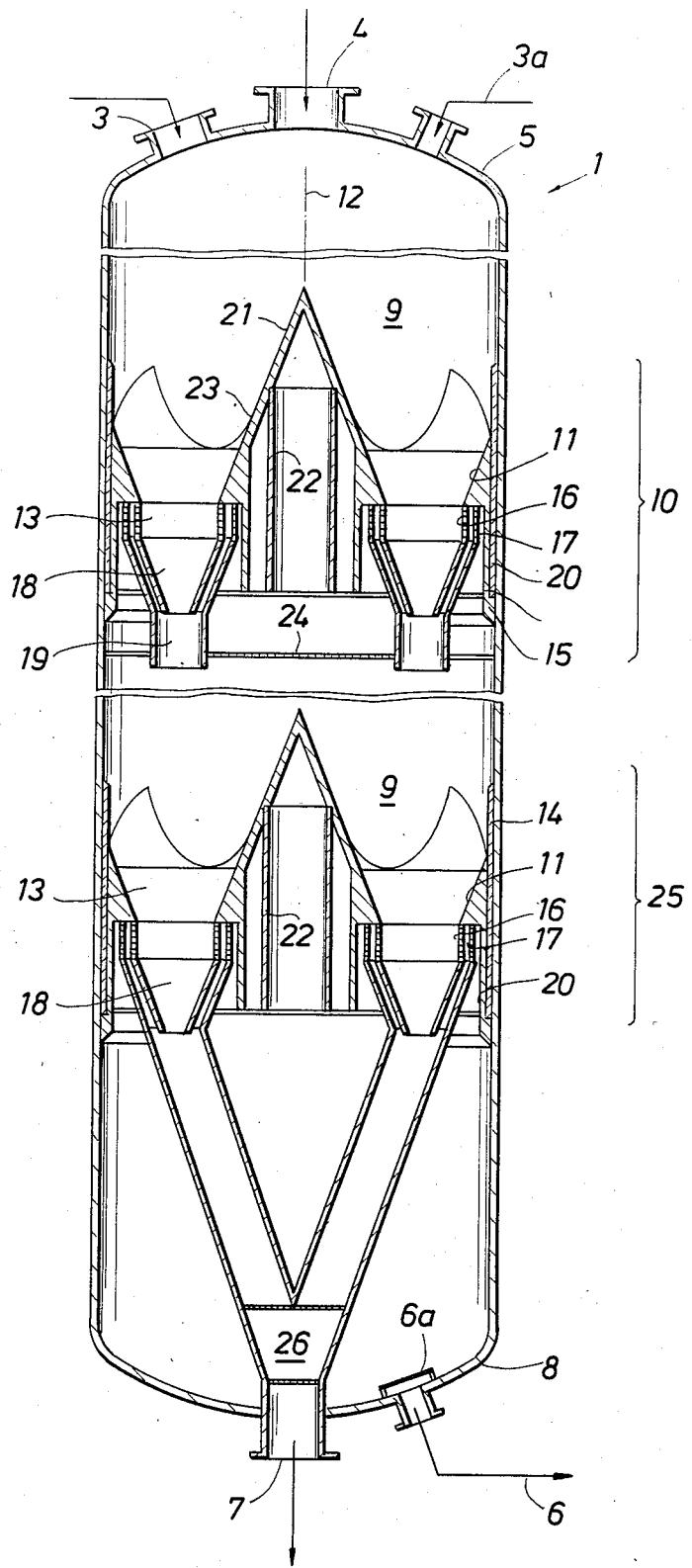

CONTINUOUS PROCESS FOR THE CATALYTIC TREATMENT OF HYDROCARBON OILS

FIELD OF THE INVENTION

The present invention relates to a continuous process and an apparatus for the catalytic treatment of hydrocarbon oils.

BACKGROUND OF THE INVENTION

It is an important aspect in catalytic reactions employing catalysts which have to be replaced periodically, e.g. for regeneration, to reduce the off-stream time of the reactors as much as possible. It has been suggested to use swing reactor systems which allow production to continue in one or more reactors while the catalytic material present in one or more other reactors is being replaced or regenerated. These systems, however, give rise to relatively large and complicated plants and are therefore expensive.

A major improvement has been described in British Patent Specification No. 1,384,762 which refers to a continuous process for the catalytic treatment of hydrocarbon oils which is carried out in one or more reactors to which fresh catalyst is added and spent catalyst is withdrawn (either periodically or continuously) during operation. In this way it is possible to maintain a continuous catalytic process having moreover a substantially constant activity. Liquid and gaseous hydrocarbon oils are conveniently separated from spent catalyst in the process described in British Pat. No. 1,384,762 via a discharge system present in the bottom of reactor. The discharge funnel incorporates a screen which separates the hydrocarbon oil and the product(s) obtained by the catalytic treatment of the hydrocarbon oil from the catalyst applied, said screen being located upstream of the exit of said funnel. The spent catalyst is withdrawn through the discharge funnel and the separated liquid and gaseous materials are withdrawn through a product outlet in the bottom of the reactor.

The catalyst discharge funnel preferably comprises at least two inverted conical sections the bottom of an upper section being connected to the top of a lower section by means of a cylindrical screen section. The conical sections facilitate the mass-flow of catalyst down the reactor. The walls of the screen are normally parallel to the direction of catalyst flow, viz. at 90° to the horiozontal plane. This arrangement is favorable because the resistance to catalyst flow is minimized. This point may be especially important where a woven screen is used which does not favor catalyst flow down the reactor because of its rough nature.

Since the main function of the screen resides in providing separation of liquid and gaseous hydrocarbons from catalyst particles, it will be clear that the openings in the screen are such that catalyst particles cannot pass through the screen.

A problem arises, however, when the catalyst mass travelling through the reactor also contains broken particles (either present originally or originating from catalyst particles or inerts present in the reactor) and/or particles, of a smaller size which may either pass through the screen, or, even worse, tend to get stuck into openings in the screen blocking passage of liquid and gaseous materials through the screen. Also the relatively low pressure differential which is formed advantageously by the normal use of the screen will be disturbed gradually which seriously affects operation efficiency.

SUMMARY OF THE INVENTION

It is now proposed to provide the catalyst discharge funnel with a further screen (forming part of the discharge system) having a mesh size larger than the main screen, which allows retention of smaller particles or parts of fresh particles which pass through the main screen and prevents them from leaving the reactor through the product outlet.

Moreover, when the openings in the main screen are chosen so as to allow passage of a substantial part of broken and/or smaller particles, blockage of the main screen will be reduced substantially, if not avoided at all. The presence of a further screen having a mesh size larger than the main screen causes retention of broken and/or smaller particles and is less prone to fouling as it will come into contact with only a small part of the total catalyst load.

The present invention thus relates to a continuous process for the catalytic treatment of a hydrocarbon oil by passing said oil through one or more catalyst beds within a reactor wherein catalyst is withdrawn from the bottom of the reactor and fresh catalyst is supplied to the top thereof, said catalyst being withdrawn through a discharge funnel contained in the bottom of said reactor, which funnel allows for separation of product from the catalyst via a screen located in the funnel upstream of the exit end of said funnel, the withdrawal of product being effected via a product outlet, in which process use is made of a further or second screen forming part of the discharge system, which is located between the main screen of the funnel and the product outlet and having a larger mesh size.

DETAILED DESCRIPTION OF THE INVENTION

The process according to the present invention may be used for operation in the gaseous phase or for operation in the liquid phase or for operation partly in the gaseous phase and partly in the liquid phase. The hydrocarbon oil is normally introduced at the top of the reactor and passes in downflow cocurrently with the catalyst (when catalyst is withdrawn) through the reactor and the product is separated from the catalyst using the screens in accordance with the invention and is withdrawn from the reactor via the product outlet in the bottom of the reactor.

The present process may be employed for a great variety of continuous catalytic treatments of hydrocarbon oils including such treatments as catalytic cracking, reforming, polymerization, alkylation and isomerization. It is particularly suitable for the catalytic hydrotreatment of hydrocarbon oils in which the oil is passed together with a hydrogen-containing gas over the catalyst bed(s). Such hydrotreatments include, without limitation, hydrogenation, hydrocracking, hydrodemetallization, hydrodesulfurization and/or hydrodenitrification.

The catalytic hydrotreatment of hydrocarbon oils which are at least in part in the liquid phase is advantageously carried out according to the present process. Accordingly the oil feedstock may comprise high boiling hydrocarbon oils such as distillate or residual oils obtained from the atmospheric or vacuum distillation of crude petroleum. Heavy oils obtained by catalytic or thermal cracking of petroleum fractions are also highly suitable feedstock for the hydro-processes carred out in accordance with this invention.

In a particular embodiment the present invention may be advantageously employed for removal of metal contaminants from and the hydrodesulfurization of a residual oil.

The present process is preferably applied as a preliminary step in a process for the hydrodesulfurization of residual oils. It provides very conveniently a method for continuous and efficient operation. In such a process the residual oil feed is advantageously first fed to one or more reactors operating the process according to the invention wherein the metal contaminants in the oil are substantially reduced and the sulfur content of the oil is preferably decreased. Then the substantially demetallized oil is fed to one or more (fixed bed) hydrodesulfurization reactors in which the oil is hydrodesulfurized.

The supply and withdrawal of catalyst is usually effected periodically but may in some cases be continuous.

In the former case the supply of fresh catalyst may be effected at the same time as the withdrawal of spent catalyst. In practice this is not so convenient, however, and it is preferred to first withdraw an amount of spent catalyst and then immediately afterwards to supply an equal amount of fresh catalyst. This sequence of withdrawal followed by supply may be reversed if desired. In each withdrawal/supply period between 0.1% and 100% of the total catalyst inventory may be withdrawn/supplied. Preferably the withdrawal/supply range is restricted to between 0.5% and 20% of the total catalyst inventory. The duration of each withdrawal period preferably varies from 5 to 60 minutes and the number of withdrawal periods per week preferably varies from 1 to 200.

In the case of continuous catalyst supply and withdrawal, which may for instance be desirable when the rate of catalyst deactivation is high thus requiring a correspondingly high rate of catalyst replenishment, between 0.1% and 100% of the total catalyst inventory is suitably withdrawn per hour while fresh catalyst is added at the same rate. Preferably between 0.5% and 20% of the total catalyst inventory is, however, withdrawn and supplied to the reactor per hour.

The dimensions of the catalyst particles used in the present process may vary widely and the catalyst particle diameters may lie in the range of 0.1 to 10 millimeters, provided that the main screen in the catalyst dishcharge funnel is provided (or can be provided) with the appropriate mesh size. However, in order to obtain a good contact between the active places on and within the catalyst particles and the liquid and/or gas the catalyst particles preferably prossess relatively small diameters. Accordingly catalyst particles having diameters in the range of 0.5 to 5 millimeters are preferred.

As mentioned hereinbefore the present process can be used very suitably for the catalytic hydrotreatment of hydrocarbon oils. Catalysts which may be advantageously employed for such hydrotreatments comprise one or more metals of Group VI B (chromium, molybdenum, tungsten) and/or the Iron Group (iron, nickel, cobalt) of the periodic Table of Elements and/or one or more oxides and/or sulfides of such metals(s) deposited on a refractory oxidic carrier. Examples of such a carrier are alumina, silica, magnesia, titania and mixtures thereof.

The reaction conditions employed in the hydrotreatments according to this invention may vary within wide limits and primarily depend on the nature of the hydrocarbon oil feedstock used. The temperature may vary between 200° C. and 475° C. and the total pressure from 20 to 350 kg/cm$^2$. The weight hourly space velocity may vary between 0.1 and 10 parts by weight of fresh oil feed per part by volume of catalyst per hour.

The catalyst discharge funnel which is incorporated in the bottom of the reactor may comprise any funnel system which facilitates mass-flow of catalyst down the reactor at such times as spent catalyst is being withdrawn from the bottom of the reactor. By mass-flow is meant that the catalyst particles move down at about equal rates in the cylindrical part of the reactor at whatever points in this part of the reactor the particles are situated. This means that all catalyst particles have about the same residence time within the reactor and that therefore the spent catalyst particles withdrawn at the bottom will be deactivated to substantially the same degree. Without the use of such a discharge funnel the catalyst particles descend the reactor in funnel flow in which the particles at the center of the reactor descend faster than those at the sides of the reactor, part of the catalyst inventory situated near the wall of the reactor possibly being even stagnant. As a consequence a substantial proportion of relatively active catalyst is withdrawn at each withdrawal period which results in inefficient operation of the reactor.

The presence of a screen located in the funnel upstream of the exit end thereof not only allows for the desired separation of liquid and gaseous materials from the catalyst particles, but it also causes a relatively low pressure differential between the screen and the main catalyst bed thus curbing or even preventing any liquid and/or gaseous surging effects operating in the catalyst bed inside the funnel system.

The shape of screen and the angle which the screen makes with the horizontal plane may vary widely. For practical and economic reasons, however, the screen is generally flat and the angle which the plane of the screen makes with the horizontal plane is between 45° and 90°.

The main screen is normally composed of a plurality of bars arranged horizontally or vertically at a distance from each other to form a plurality of slits, which may be reinforced by a plurality of reinforcing bars. The further or second screen used in the process according to the present invention is normally constructed in a similar way as the main screen provided that it has a larger mesh size.

Because of its larger mesh size it will retain broken and/or smaller particles which have passed through the main screen and prevent them from being present in the product. Since only a relatively small part of the total catalyst mass will pass through the main screen, blockage of the further screen is less likely to occur which ensures a good separation of liquid and gaseous materials from the catalyst. If desired, the broken and/or smaller particles may be retained in the space between the main screen and the further screen when the further screen forming part of the discharge system is superposed on the catalyst discharge funnel. Preferably the particles retained by the further screen are reintroduced to the catalyst mass which will leave the reactor via the catalyst discharge funnel by keeping the further screen in open connection with the catalyst discharge funnel downstream of the main screen.

Preferably, the process according to the present invention is carried out using a main screen which has a mesh size smaller than normal, which allows passage of relatively larger chunks or chips of relatively large particles so that blocking of the main screen will be reduced substantially, thus improving the efficiency of the process. The further or second screen may have either the normal mesh size (which is then larger than that of the main screen) so that normal separation of liquid and gaseous materials from the particles will be achieved or it may have an even larger mesh size which substantially prevents the presence of broken and/or smaller particles in the product stream.

Suitably, the screen located in the funnel, has a mesh size allowing passage of particles or parts thereof having a smallest diameter of not more than half that of fresh particles. The further screen preferably has a mesh size which retains particles or parts thereof having a smallest diameter of less than 10% of that of fresh particles.

The process according to the present invention is normally carried out using mesh sizes of between 4 and 300 (Tyler equivalents of U.S. Sieve Series, A.S.T.M.-E 11-61) for the main screen. Preferably, mesh sizes between 8 and 65, in particular between 10 and 35 are used for the main screen.

The further or second screen is preferably operated when positioned substantially parallel to the main screen.

The physical characteristics of the catalyst discharge funnel used in any process carried out in accordance with the present invention should be such that smooth discharge of catalyst may be effected. In this regard the size of the catalyst particles used is of critical importance. It is essential that the physical dimensions of the funnel exit are such that for the particular size of catalyst particles used blocking of the exit by the phenomenon known in the art as bridge formation does not occur. Accordingly the shortest characteristic diameter of a particular funnel exit is preferably not smaller than 10 centimeters. A circular funnel exit having a diameter of at least 10 centimeters is preferably employed in the present invention.

Mass flow of catalyst in the reactor is normally induced by employing two or more inverted conical sections and one or more cylindrical screen sections wherein the conical sections make angles with the vertical axis of the reactor of between 5° and 45°. A more preferred range (which includes the majority of processes operated according to the present invention) is between 10° and 35°. The angles which the inverted conical sections make with the vertical axis of the reactor are preferably the same.

The process according to the present invention is suitably carried out in a reactor also containing one or more catalyst supporting means, in particular in the form of one or more downwardly converging conical surfaces the lower end thereof being connected to one or more vertical outlet channels having circumferential walls for the combined passage of catalyst and separation of reactor effluent, said circumferential walls being provided with a screen section for withdrawing the effluent from the catalyst which effluent is redistributed over a further downstream catalyst bed. The circumferential walls advantageously comprise a further screen according to the present invention.

The process according to the present invention is preferably carried out in a reactor of the type specified above wherein at least the intermediate catalyst bed supporting means consists of a plurality of interconnected downwardly converging frusto-conical surfaces, having their lower ends connected to spaced apart vertical outlet channels having circumferential walls provided with substantially circumferential screen sections for withdrawing reactor effluent from catalyst, the vertical outlet channels having their axes arranged substantially uniformly distributed in a circular pattern. Preferably, the circumferential walls comprise the further or second screen according to the present invention.

A third screen disposed between the product outlet and the further or second screen may be present as an additional safeguard in case of failure of the further or second screen during operation.

It may be useful when operating catalytic hydrotreatment processes to introduce fresh hydrogen-containing gas into the bottom of the reactor. The introduction of a hydrogen-containing gas is advantageous in that it causes the hydrocarbon oil present in the reactor below the further screen to change continuously thus impeding undesirable reactions. Since the hydrogen-containing gas will normally be supplied below the temperature of the hydrocarbon oil and the catalyst occuring at the bottom of the reactor, a cooling effect can be obtained to such temperatures at which the undesirable reactions are no longer sustained. Alternatively, it is possible to introduce oil below process-temperature into the bottom of the reactor.

Discharge of (spent) catalyst advantageously takes place via a conduit as described in British Patent Specification No. 1,384,762 in which the catalyst firstly passes a solid-handling valve and subsequently a liquid- and gastight high pressure valve. Any suitable solid-handling valve may be used but preferably a rotary valve.

The present invention also includes an apparatus suitable for carrying out the process defined hereinbefore, which comprises a reactor vessel containing a feed inlet, one or more catalyst beds and the bottom of which contains a product outlet, and a catalyst discharge funnel which incorporates a screen upstream the exit end of said funnel, wherein a further screen having a larger mesh size is present forming part of the discharge system and which is located between the main screen of the funnel and the product outlet.

In a preferred embodiment of the invention the screen located in the funnel has a mesh size allowing passage of particles having a smallest diameter of not more than half that of fresh particles. The further screen has preferably a mesh size which retains particles having a smallest diameter of less than 10% of that of fresh particles.

The further or second screen is preferably positioned substantially parallel to the screen(s) located in the funnel. The further or second screen is preferably in open connection with the lower end of the discharge funnel.

The apparatus suitably also comprises catalyst support means, in particular in the form of one or more downwardly converging conical surfaces the lower end thereof being connected to one or more vertical outlet channels having circumferential walls for the combined passage of catalyst and separation of reactor effluent, said circumferential walls being provided with a screen section for withdrawing the effluent from the reactor which effluent is redistributed over a further downstream catalyst bed. The circumferential walls advantageously comprise a further screen according to the present invention.

The apparatus according to the present invention is preferably carried out in a reactor of the type specified above wherein at least the intermediate catalyst bed supporting means consists of a plurality of interconnected downwardly converging frusto-conical surfaces, having their lower ends connected to spaced apart vertical outlet channels having circumferential walls provided with substantially circumferential screen sections for withdrawing reactor effluent from catalyst, the vertical outlet channels having their axes arranged substantially uniformly distributed in a circular pattern. Preferably, the circumferential walls comprise a further screen according to the present invention.

Preferably, the apparatus according to the present invention provides for the discharge of (spent) catalyst via a conduit as described in British Patent Specification No. 1,384,762 in which the catalyst firstly passes a solid-handling valve and subsequently a liquid- and gastight high pressure valve. Any suitable solid-handling valve may be present but preferably a rotary valve.

In a preferred embodiment of the invention the catalyst discharge funnel consists of at least two inverted conical sections the bottom of an upper section being connected to the top of a lower section by means of a cylindrical screen section.

In order to prevent bridge formation of the catalyst during discharge the shortest characteristic length of a particular funnel exit is preferably not smaller than 10 centimeters. If a circular funnel exit is employed as is preferred according to the present invention, the diameter of the funnel exit is preferably not less than 10 centimeters.

In order to induce mass flow of catalyst down the reactor the angles which the conical sections make with the vertical axis of the reactor preferably lie between 5° and 45°. The angles which the conical sections make with the vertical axis of the reactor are the same in a more preferred embodiment.

If desired, a third screen may be present in the bottom of the reactor.

The mesh size of the screens used in the discharge system depends on the location of the appropriate screen as discussed hereinbefore and is preferably between 0.1 and 10 millimeters.

As mentioned hereinbefore inlets for introducing fresh hydrogencontaining gas and/or cold oil can be present at the bottom of the reactor.

The invention may be performed in various ways and some specific embodiments will now be further elucidated with reference to the drawing in which accessories such as valves, additional supply lines, pumps, control instruments and the like are not shown.

A method in which the process and apparatus according to the present invention are suitably used for the demetallization of residual oils as a preliminary step in a process for the hydrodesulfurization of residual oils is diagrammatically shown in the drawing.

BRIEF DESCRIPTION OF THE DRAWING

The instant drawing is a side view of the apparatus of this invention.

DETAILED DESCRIPTION OF THE DRAWING

The drawing shows a vertical section of a normally vertically extending substantially cylindrical reactor vessel 1 having a side wall 2. The reactor vessel 1 is provided with separate inlets 3 and 4 for reactant (a heated metal-contaminated, sulfur-containing residual oil which may have been mixed with a hydrogen-containing gas) and catalyst, respectively, in the top part 5 of the vessel and separate discharge funnels 6 and 7 for reactor effluent and catalyst, respectively, in the bottom part 8 of the vessel. If desired, a hydrogen-containing gas may be supplied separately via line 3a. The reactor vessel 1 may be internally provided with a plurality of superposed catalyst bed supporting means, dividing the interior of the vessel into a plurality of reactor zones 9. The catalyst bed supporting means may be distinguished into intermediate supporting means and bottom supporting means.

The intermediate catalyst bed supporting means which presence forms a preferred embodiment of the present invention, generally indicated with reference numeral 10, consists of a plurality of downwardly converging frusto-conical surfaces 11 having their axes arranged in a circular pattern substantially coaxially with the main axis 12 of the reactor vessel 1. The converging conical surfaces 11 each terminate at their lower ends in a vertical outlet channel 13 for the passage of catalyst and reactor effluent. In this example the angle with the vertical axis of the conical surfaces 11 is about 20°. The conical surfaces are connected to an upwardly extending cylindrical structure 14, which in its turn is supported by cone supports 15 at the inner surface of the reactor side wall 2.

Each vertical outlet channel 13 is provided with a ringshaped main screen 16 and a further screen 17 having a larger mesh size than the main screen 16 in the channel wall for separating reactor effluent, which passes through the screen opening, from the catalyst. Broken particles and/or smaller particles which passed through the screen 16 are retained by the further screen 17 located substantially parallel with screen 16. The reactor effluent leaves the reactor vessel 1 via product outlet 6 which may be provided with a third screen 6a and passes on to other equipment not shown in the drawing. The vertical outlet channels 13 each comprise a substantially cylindrical upper part in which the screens are positioned, a downwardly converging intermediate part 18 and a substantially cylindrical lower part 19. The downwardly converging intermediate parts 18 are intended to increase the back pressure in the channels 13 during operation and thereby promoting the separation of reactor effluent from the catalyst via the screens 16 and 17. The half top angle of the intermediate parts 18 should preferably be chosen in the range from 15–45 degrees to promote mass flow of catalyst through the outlet channels 13. For absorbing the vertical load on the screens 16 in the vertical outlet channels the screens are preferably supported via baffles (not shown) by cylindrical skirts 20 secured to the main support structure 14.

The parts of the conical surfaces 11, which face one another are at their upper end connected to a substantially centrally arranged upwardly converging cone 21. The top angle of this cone 21 is preferably chosen substantially equal to the top angle of the conical surfaces 11 to provide a smooth passage for catalyst from an upper part of the catalyst bed into the vertical outlet channels 13. The cone 21 is supported by the main support structure 14 via a tubular element 22 and a further skirt 23.

The vessel may be further provided with a quench fluid supply system (not shown) and with liquid distributor trays 24 above the catalyst beds supported on the conical surfaces 11.

Although only one intermediate catalyst bed supporting means, formed by the conical surfaces 11, is shown in the drawing, it should be understood that a plurality of such intermediate superposed catalyst bed supporting means may be applied.

In the embodiment of the vessel shown in the drawing, the bottom catalyst bed supporting means, generally indicated with reference numeral 25, is formed in the same manner as the intermediate catalyst bed supporting means 10. The various components of the supporting means 25 have therefore been indicated with the same reference numerals as the parts of the supporting means 10. The vertical outlet channels 13 of the bottom catalyst bed supporting means 25 terminate at their lower ends in a single catalyst discharge funnel 26 passing through an opening in the bottom of the vessel thereby forming the catalyst outlet 7.

It will be understood that instead of using a perforated single catalyst discharge funnel 26, it is also possible to have the lower vertical outlet channels extended through openings in the bottom of the vessel. In this case the catalyst outlet is formed by the lower ends of the vertical outlet channels together.

The introduction of fresh catalyst to the reactor during operation is effected via line 4 (detailed equipment not shown).

Preferably, the further screen 17 having a larger mesh size than the main screen 16 is located parallel to screen 16.

Although the main screen 16 may form a continuous part of the outlet channel 13 which means that screen 16 and screen 17 enclose a space where broken and/or smaller particles will be collected, preference is given to the system disclosed in the drawing wherein the screen 17 is in open connection with the outlet channel 13. If desired, supporting rods may be present to support screens 16 and 17 (not shown).

It should be noted that the various parts have been shown only schematically merely for mentioning their presence and not as a detailed mechanical description of this construction.

It will be understood that the invention is not restricted to the embodiments described hereinabove.

What is claimed is:

1. A continuous process for the catalytic hydrotreatment of a hydrocarbon oil which comprises passing said hydrocarbon oil through at least one catalyst bed within a reactor vessel wherein catalyst and hydrocarbon oil are passed into the top part of said vessel and wherein catalyst and hydrotreated hydrocarbon oil product are individually withdrawn from the bottom of the reactor vessel respectively through a catalyst outlet and a hydrotreated hydrocarbon oil outlet, wherein said catalyst outlet comprises a discharge funnel to allow separation of said hydrotreated hydrocarbon oil from said catalyst by passing said catalyst and said hydrotreated hydrocarbon oil through a first main screen of said funnel to separate said catalyst from said hydrotreated hydrocarbon oil and passing said hydrotreated hydrocarbon oil derived from said first main screen through a second screen in said discharge funnel positioned substantially parallel to said first main screen, wherein said second screen has apertures therein of greater mesh size than the mesh size of said first main screen to allow separation of said hydrotreated hydrocarbon oil from any broken and/or smaller particles of catalyst contained in said hydrotreated hydrocarbon oil derived from said first screen and to form a relatively catalyst particle-free stream of hydrotreated hydrocarbon oil for withdrawal from said hydrotreated hydrocarbon oil outlet in said bottom of said reactor vessel.

2. The process according to claim 1 wherein said first main screen located in said discharge funnel has a mesh size to allow passage of catalyst particles or parts thereof through said first main screen having a smaller diameter of not more than half that of the diameter of fresh catalyst particles.

3. The process according to claim 2 wherein the second screen has a mesh size which retains catalyst particles or parts or parts thereof having a smaller diameter of less than 10% of the diameter of fresh catalyst particles.

4. The process according to claim 1 wherein said second screen is in open connection with a lower end of said discharge funnel.

5. The process according to claim 4 wherein the reactor vessel contains one or more catalyst support means upstream of the discharge funnel.

6. The process according to claim 5 wherein said catalyst support means comprises one or more downwardly converging conical surfaces, the lower end of which is connected to one or more vertical outlet channels having circumferential walls for the combined passage of catalyst and hydrotreated hydrocarbon oil.

7. The process according to claim 1 wherein said hydrocarbon oil is a residual oil that is hydrodesulfurized to simultaneously remove metal contaminants from said residual oil.

8. The process according to claim 1 wherein spent catalyst is periodically withdrawn from said catalyst outlet and fresh catalyst is added to said reactor vessel through the top of said reactor vessel.

9. The process according to claim 1 wherein spent catalyst is continuousy withdrawn from said catalyst outlet and fresh catalyst is continuously added to said reactor vessel through the top of said reactor vessel.

10. The process according to claim 1 wherein the bottom of said reactor vessel incorporates a third screen intermediate the product outlet and the second screen.

* * * * *